United States Patent
Kumar (10) Patent No.: US 7,500,082 B2
(45) Date of Patent: Mar. 3, 2009

(54) AUTOMATING THE TESTING OF SOFTWARE OR HARDWARE COMPONENTS BY DYNAMICALLY CREATING VIRTUAL STORAGE DEVICES ON A SIMULATED SYSTEM BUS IN A PHYSICAL COMPUTER SYSTEM

(75) Inventor: Arunvijay Kumar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 198 days.

(21) Appl. No.: 11/000,618

(22) Filed: Dec. 1, 2004

(65) Prior Publication Data

US 2006/0130074 A1    Jun. 15, 2006

(51) Int. Cl.
| | |
|---|---|
| G06F 12/00 | (2006.01) |
| G06F 13/00 | (2006.01) |
| G06F 13/28 | (2006.01) |
| G06F 9/26 | (2006.01) |
| G06F 3/00 | (2006.01) |
| G06F 9/44 | (2006.01) |
| G06F 9/46 | (2006.01) |
| G06F 17/50 | (2006.01) |
| G06F 9/455 | (2006.01) |
| G06F 11/30 | (2006.01) |
| G06G 7/62 | (2006.01) |
| G21C 17/00 | (2006.01) |

(52) U.S. Cl. .................. 711/203; 719/324; 703/21; 703/23; 703/24; 703/13; 711/153; 711/147; 702/182

(58) Field of Classification Search .................. 703/24; 719/324; 711/100
See application file for complete search history.

(56) References Cited

U.S. PATENT DOCUMENTS

| | | | |
|---|---|---|---|
| 5,095,420 A | | 3/1992 | Eilert et al. |
| 5,694,583 A | * | 12/1997 | Williams et al. ............... 703/24 |
| 5,991,542 A | * | 11/1999 | Han et al. .................... 717/167 |
| 6,263,387 B1 | * | 7/2001 | Chrabaszcz ................. 710/302 |
| 6,538,669 B1 | * | 3/2003 | Lagueux et al. ............. 715/764 |
| 6,553,408 B1 | * | 4/2003 | Merrell et al. .............. 709/213 |
| 6,715,043 B1 | * | 3/2004 | Stevens ...................... 711/154 |
| 6,732,230 B1 | * | 5/2004 | Johnson et al. ............. 711/114 |
| 6,745,207 B2 | | 6/2004 | Reuter et al. |
| 6,757,778 B1 | * | 6/2004 | van Rietschote ............... 711/6 |

(Continued)

OTHER PUBLICATIONS

IBM-TDB-ACC-No. NN87091844, Title:Testing Multiple Discrete Software Components by Connecting Real and Simulated Hardware Components Publication-Data: IBM Technical Disclosure Bulletin, Sep. 1987, US vol. No. 30; Issue No. 4; Page No. 1844-1845 Sep. 1, 1987 (19970901).*

(Continued)

*Primary Examiner*—Sanjiv Shah
*Assistant Examiner*—Marwan Ayash
(74) *Attorney, Agent, or Firm*—Woodcock Washburn LLP (57) ABSTRACT

Disclosed is a method for automating testing tasks which would otherwise have to be done manually using actual hardware by providing the capability to dynamically create many types of storage devices with different storage media, thus eliminating the need to have test machines with the actual hardware. In one embodiment a virtual storage device driver can be implemented that can be used to simulate various storage devices such as CD-ROM, CD-R, CD-RW, removable disk drives and fixed disk drives. Manual testing tasks such as testing autoplay functionality when a CD is inserted, testing CD burning, and testing CD audio playback can then be automated.

17 Claims, 4 Drawing Sheets

U.S. PATENT DOCUMENTS

| | | |
|---|---|---|
| 6,845,403 B2 | 1/2005 | Chadalapaka |
| 6,880,052 B2 | 4/2005 | Lubbers et al. |
| 7,079,999 B2 * | 7/2006 | Nagaki et al. .................. 703/20 |
| 7,093,086 B1 * | 8/2006 | van Rietschote ............ 711/161 |
| 7,203,944 B1 * | 4/2007 | van Rietschote et al. .... 718/104 |
| 2002/0112232 A1 * | 8/2002 | Ream et al. .................. 717/176 |
| 2003/0061401 A1 * | 3/2003 | Luciani, Jr. .................. 709/324 |
| 2003/0195737 A1 * | 10/2003 | Shapiro et al. ................. 703/24 |
| 2004/0243385 A1 * | 12/2004 | Rothman et al. ............... 703/24 |
| 2004/0250043 A1 | 12/2004 | Ripberger et al. |
| 2005/0015702 A1 * | 1/2005 | Shier et al. .................. 714/776 |
| 2006/0010287 A1 * | 1/2006 | Kim ........................... 711/112 |

OTHER PUBLICATIONS

Optical and removable disk drives http://www.disktrend.com/newsopt.htm, 1999.*

Daemon Tools is a virtual cd/dvd-rom emulator http://www.daemon-tools.cc/dtcc/download.php?mode=ViewCategory&catid=5, May 20, 2003.*

Virtual Disk 1.30 Final Jan. 25, 2004 http://www.totalcmd.net/plugring/virtdisk.html.*

* cited by examiner

AUTOMATING THE TESTING OF SOFTWARE OR HARDWARE COMPONENTS BY DYNAMICALLY CREATING VIRTUAL STORAGE DEVICES ON A SIMULATED SYSTEM BUS IN A PHYSICAL COMPUTER SYSTEM

TECHNICAL FIELD

The present invention pertains to computer systems and computer system devices and, more particularly, to implementation of a virtual device driver.

BACKGROUND OF THE INVENTION

Conducting thorough testing of new hardware and software components is an essential step in developing and releasing products to market. To ensure that a particular component is compatible across as large of a user base as possible it needs to be tested with a wide variety of system configurations. However, maintaining such a large on-hand cache of various hardware and software components can prove to be a technically, financially, and administratively burdensome task. By reducing the number of actual hardware and software components to be maintained many advantages are realized, such as lower total lifecycle infrastructure costs and fewer required software licenses. Moreover, many environmental benefits can also be achieved, including hardware footprint reduction, power reduction, and reduced ambient cooling demands.

In the 1970's the concept of virtual machines was introduced in the VAX VMS environment. A virtual machine appears to be its own operating system running its own applications, but the virtual machine does not actually communicate with the hardware directly. Instead the virtual machine communicates to virtualized hardware and it is an underlying host operating system that actually handles the communication directly to the hardware. While virtual machine technology can be useful in testing software and hardware components and simulating an actual computer environment, virtual machine technology possesses some limitations which can hinder its use in software and hardware component testing. For example, the virtual machine will typically be constrained by the physical machine and hardware that the virtual machine is spooled up on. This can be particularly problematic, for instance, when a test scenario or multiple test scenarios may call for many different types of storage devices and/or storage media.

Accordingly, a need exists for a method or program that is able to dynamically create many types of virtual storage device components with different storage media, and, preferably can be implemented on both virtual and non-virtual machine platforms. The invention provides such a method. These and other advantages of the invention, as well as additional inventive features, will be apparent from the description of the invention provided herein.

SUMMARY OF THE INVENTION

In view of the foregoing, the present invention provides a method for automating testing tasks which would otherwise have to be done manually using actual hardware by providing the capability to dynamically create many types of storage devices with different storage media, thus eliminating the need to have test machines with the actual hardware. In one embodiment a virtual storage device driver can be implemented that can be used to simulate various storage devices such as CD-ROM, CD-R, CD-RW, removable disk drives and fixed disk drives. Manual testing tasks such as testing autoplay functionality when a CD is inserted, CD burning, and CD audio playback testing can then be automated.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

In the description that follows, the invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the computing device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

I. Exemplary Environment

Figure 1:
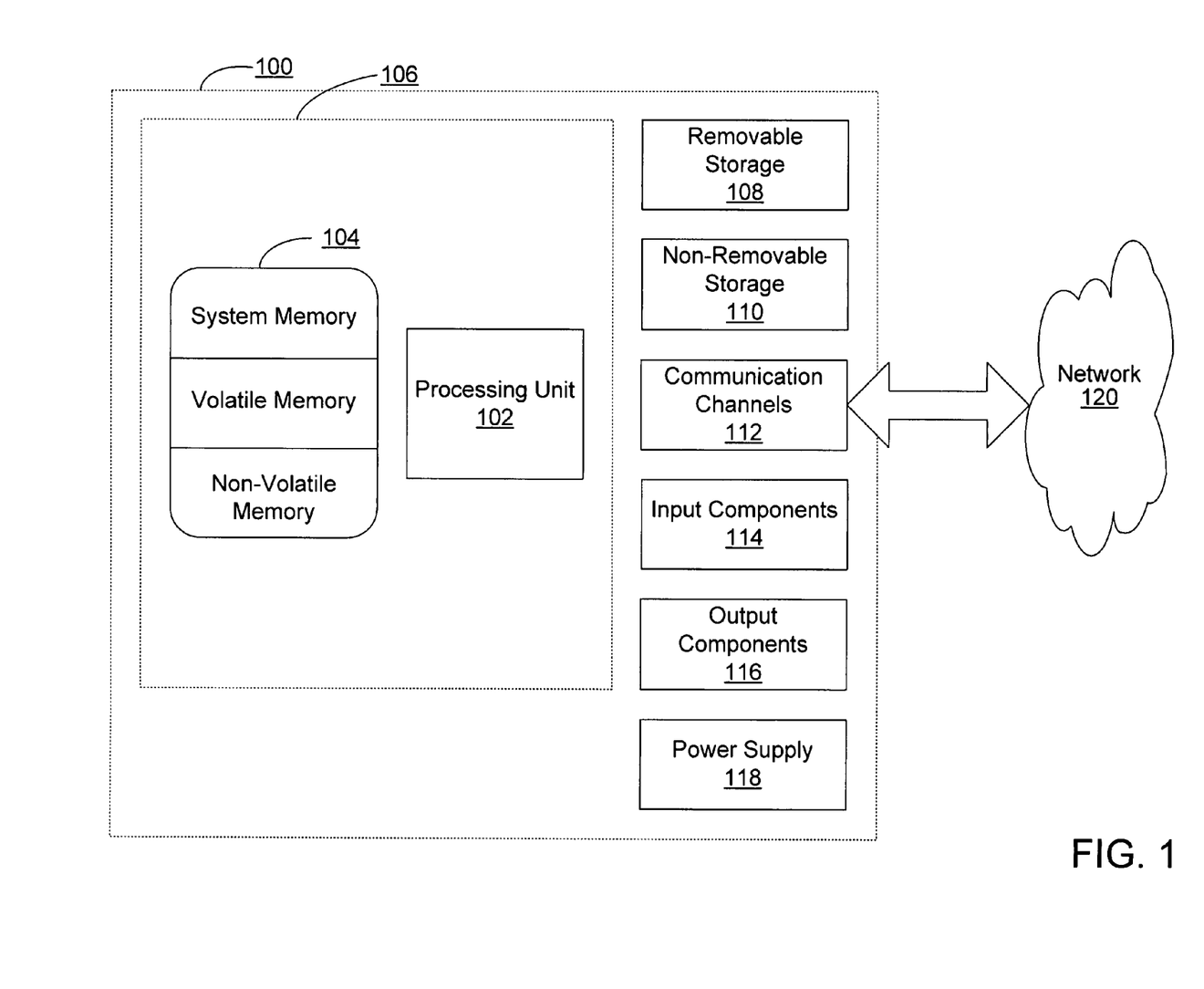
FIG. 1 is a schematic diagram of an exemplary computer architecture on which the virtual storage device driver of the present invention can be implemented.

Referring to FIG. 1, in one embodiment the present invention relates to implementing a virtual storage device driver to dynamically create many types of storage devices, with different storage media, on a physical computer. The computer can be a device that may have one of many different computer architectures. For descriptive purposes, FIG. 1 shows a schematic diagram of an exemplary architecture usable for these devices. The architecture portrayed is only one example of a suitable environment and is not intended to suggest any limitation as to the scope of use or functionality of the invention. Neither should the computing devices be interpreted as having any dependency or requirement relating to any one or combination of components illustrated in FIG. 1. The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing device 100 typically includes at least one processing unit 102 and memory 104. The memory 104 may be volatile (such as RAM), non-volatile (such as ROM and flash memory), or some combination of the two. This most basic configuration is illustrated in FIG. 1 by the dashed line 106.

Computing device 100 can also contain storage media devices that may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing device.

Computing device 100 can also contain communication channels 112 that allow it to communicate with other devices. Communication channels 112 are examples of communications media. Communications media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, radio, infrared, and other wireless media. The term computer-readable media as used herein includes both storage media and communications media. The computing device 100 may also have input components 114 such as a keyboard, mouse, pen, a voice-input component, and a touch-input device. Output components 116 include screen displays, speakers, printers, and rendering modules (often called "adapters") for driving them. The computing device 100 has a power supply 118. All these components are well known in the art and need not be discussed at length here.

II. Virtual Storage Device Driver

The present invention is directed to implementing a virtual storage device driver to dynamically create many types of storage devices, with different storage media, on a physical computer. For illustrative purposes only, the virtual storage device driver of the present invention is described as being implemented within the Microsoft Windows® operating system kernel, by Microsoft Corporation of Redmond, Wash. One of ordinary skill in the art will of course appreciate that the virtual storage device driver of the present invention can be implemented in another operating system kernel using the published standards.

To allow driver developers to write device drivers that are source-code compatible across all Microsoft Windows® operating systems, the Windows Driver Model (WDM) was introduced. Kernel-mode drivers that follow WDM rules are called WDM drivers. There are three kinds of WDM drivers: bus drivers, which drive an I/O bus and provide per-slot functionality that is device-independent; function drivers, which drive an individual device; and filter drivers, which filter I/O requests for a device, a class of devices, or a bus. In this context, a bus is any device to which other physical, logical, or virtual devices are attached; a bus includes traditional buses such as SCSI and PCI, as well as parallel ports, serial ports, and i8042 ports.

The virtual storage device driver of the present invention is a bus driver that simulates a new system bus called Virtual-Bus. A bus driver services a bus controller, adapter, or bridge. Bus drivers are required drivers; there is one bus driver for each type of bus on a machine. A bus driver can service more than one bus if there is more than one bus of the same type on the machine. The primary responsibilities of a bus driver are to enumerate the devices on its bus, to respond to Plug and Play IRPs (input/output request packets) and power management IRPs, to multiplex access to the bus (for some buses), and to generically administer the devices on its bus. During enumeration, a bus driver identifies the devices on its bus and creates device objects for them. The method a bus driver uses to identify connected devices depends on the particular bus.

A bus driver performs certain operations on behalf of the devices on its bus, including accessing device registers to physically change the power state of a device. For example, when the device goes to sleep, the bus driver sets device registers to put the device in the proper device power state. Note, however, that a bus driver does not handle read and write requests for the devices on its bus. Read and write requests to a device are handled by the device's function driver. A bus driver acts as the function driver for its controller, adapter, or bridge, and therefore manages device power policy for these components.

Within Windows®, the operating system represents devices by device objects. One or more device objects are associated with each device. Device objects serve as the target of all operations on the device. Kernel-mode drivers typically create at least one device object for each device. A lowest-level driver, such as a PnP (Plug and Play) hardware bus driver, creates a physical device object (PDO) for each device it controls. An intermediate driver, such as a PnP function driver, creates a functional device object (FDO). A WDM driver creates device objects in its AddDevice routine, which is called by the PnP manager after device enumeration.

Devices are usually represented by multiple device objects, one for each driver in the driver stack that handles I/O requests for the device. The device objects for a device are organized into a device stack. Whenever an operation is performed on a device, the system passes an IRP data structure to the driver for the top device object in the device stack. Each driver either handles the IRP or passes it to the driver that is associated with the next-lower device object in the device stack.

A bus driver creates a PDO for each device that it enumerates on its bus. A PDO represents the device to the bus driver, as well as to other kernel-mode system components such as the power manager, the PnP manager, and the I/O manager. Other drivers for a device attach device objects on top of the PDO, but the PDO is located at the bottom of the device stack. The function driver creates an FDO for the device. The PnP manager ensures that the function driver for the device is loaded and calls the function driver's AddDevice routine. The function driver creates an FDO and attaches it to the device stack. In summary, the device stack contains a device object for each driver that is involved in handling I/O to a particular device. The parent bus driver has a PDO and the function driver has an FDO.

As previously mentioned, the virtual storage device driver is a bus driver that simulates a new system bus called VirtualBus. The virtual storage device driver creates new devices on this bus on demand. It returns a hardware ID that identifies the type of the device created to the Plug and Play driver. Based on this hardware ID, either cdrom.sys or disk.sys drivers attach to the device or these devices are exposed as normal CD-ROM or disk drives to the operating system.

The following is a representative device stack with the VirtualBus functional device object (Device\0000004d) at the bottom. By way of example, two devices have been created on this bus with hardware IDs "GenCdRom" and "GenDisk". Drivers that support "GenCdRom" devices such as, imapi.sys, redbook.sys, cdrom.sys have attached themselves to the virtual CDROM device. Drivers that support "GenDisk" type devices such as disk.sys, partmgr.sys etc have attached to the Virtual Disk device.

a backing store. The backing store may be implemented in removable storage 108, or non-removable storage 110.

The virtual storage device driver reads from and writes to the "sectors" of a file used as a backing store, which may be implemented in removable storage 108, or non-removable storage 110. In the case of CD-ROM devices, this underlying file can be formatted in ISO9660 or UDF formats. Removable disks can be formatted as FAT, FAT32, NTFS, ISO9660, and UDF formats. It should be noted that the backing store for a virtual drive need not be a file —in an alternative embodiment, for example, the backing store could be persisted in system memory 104 through the creation of a "RAM-disk."

Figure 2:
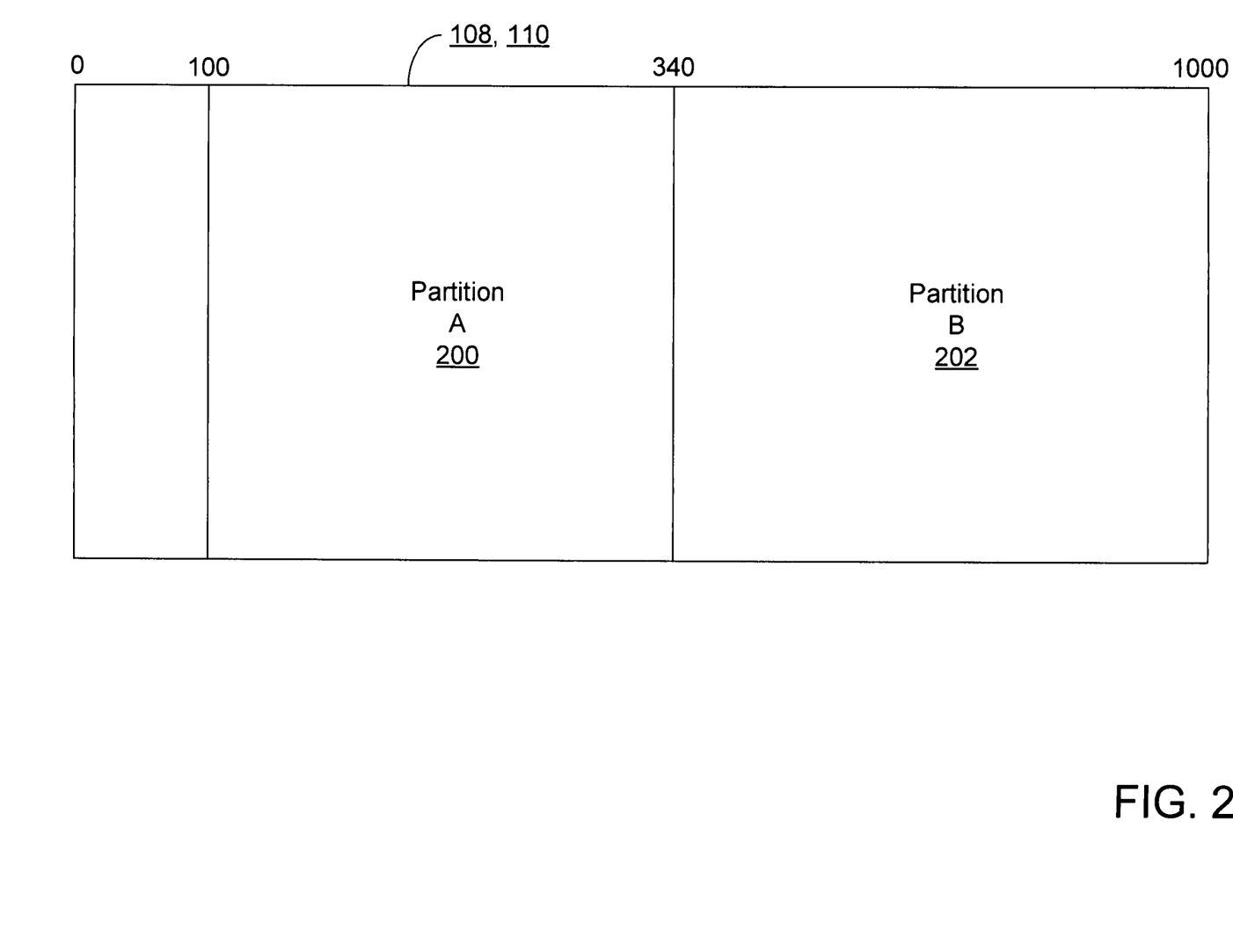
FIG. 2 is a schematic diagram showing an exemplary partitioned disk structure.

The backing store, which in the illustrated embodiment is implemented as a file on a fixed disk comprising non-removable storage 110, may contain a partition table followed by partitions 200, 202 which would contain the appropriate file system image. Such a file can be created by creating a file filled with zeroes, mounting it to the drive, and initializing it as a basic disk with no partitions. The disk can then be partitioned and each partition can be formatted to contain any file system. This backing file will then contain the necessary information and when it is used in future, all the partitions 200, 202 and volumes will be mounted.

Figure 3:
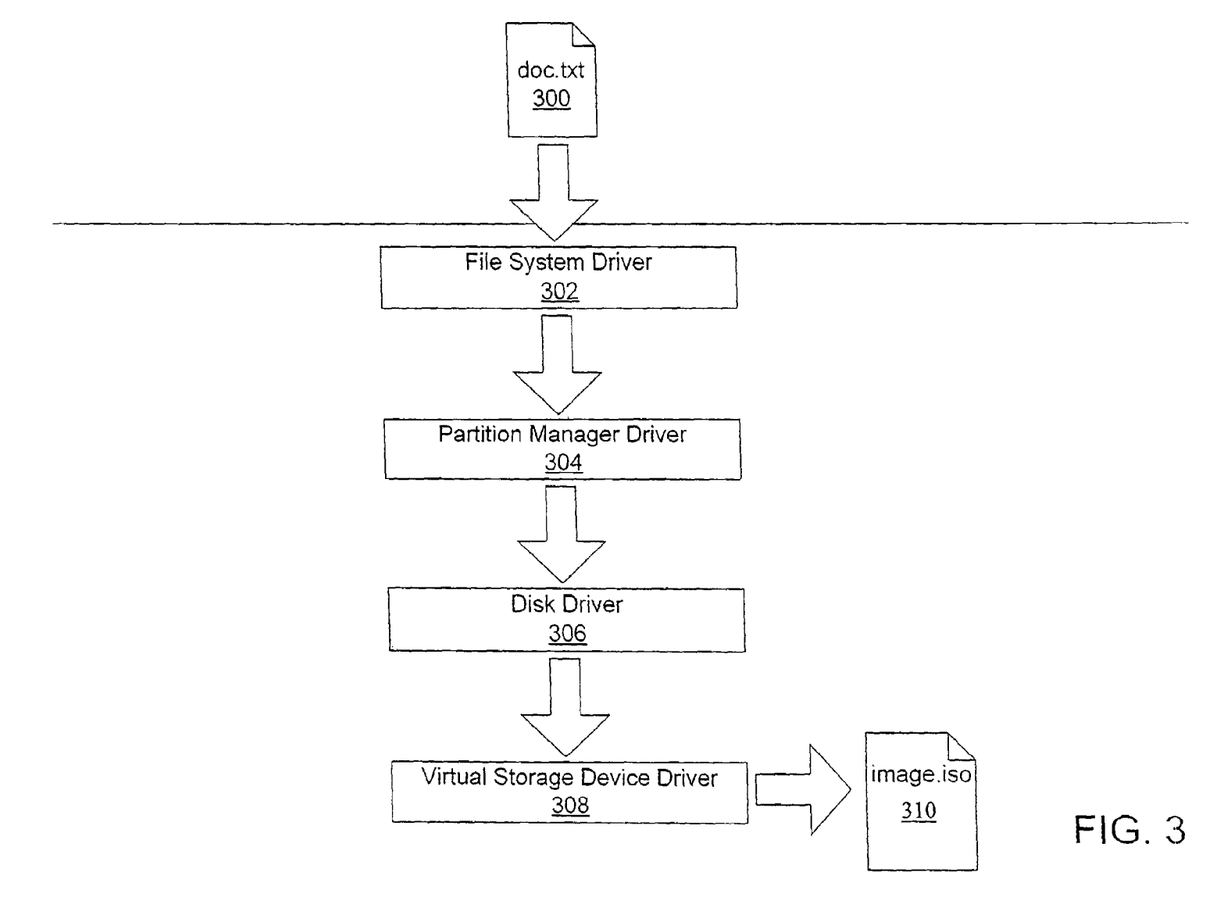
FIG. 3 is a schematic diagram showing the method for reading a file from a virtual storage device implemented by the virtual storage device driver of the present invention.
Figure 4:
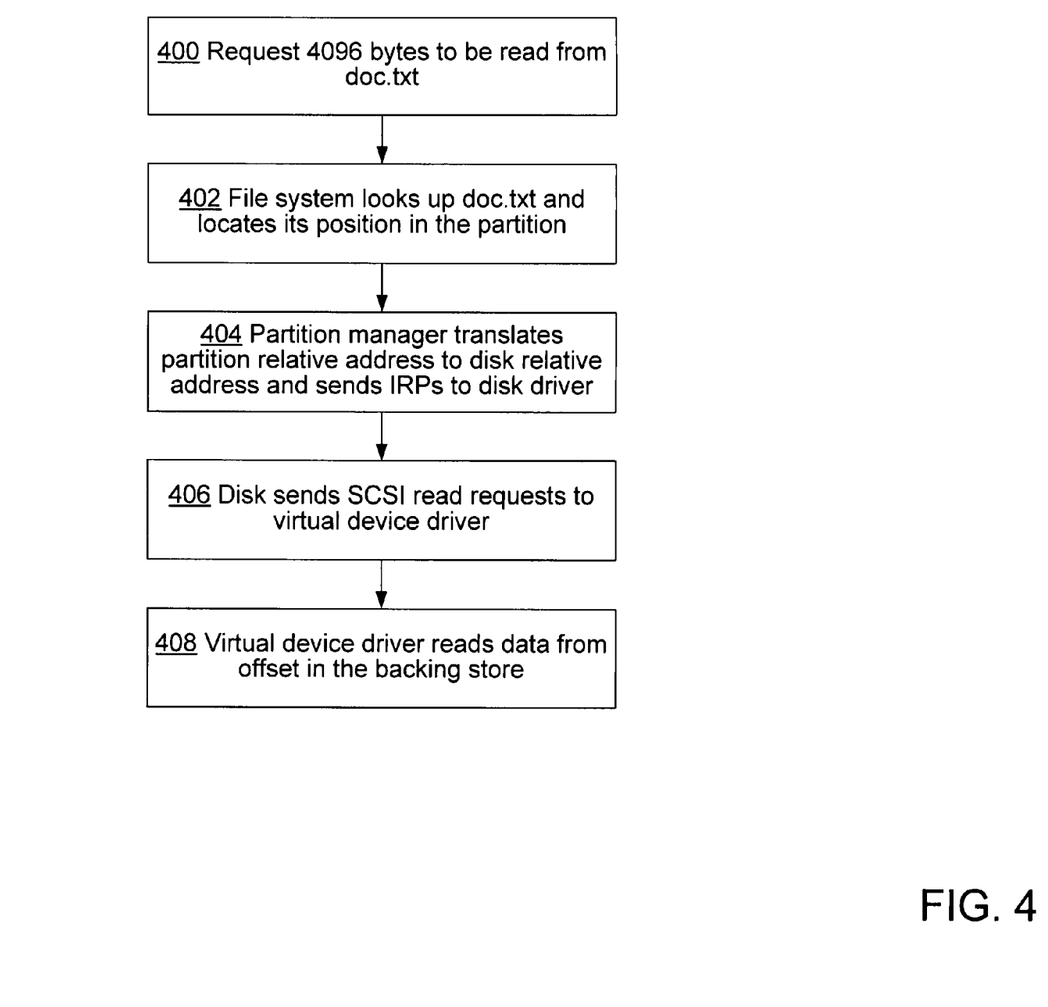
FIG. 4 is a flowchart illustrating the method for reading a file from a virtual storage device implemented by the virtual storage device driver of the present invention.

Turning now to FIGS. 3 and 4 an exemplary I/O operation utilizing the virtual storage device of the present invention is illustrated. At step 400 an application requests that the first 4096 bytes are read from the file doc.txt 300. At step 402, the file system driver 302, residing within the OS kernel, locates Once the storage class drivers attach themselves to the drive, the contents of the drive are read and the file system that recognizes the layout is mounted on the virtual drive.

III. Handling of Input/Output Operations

The file systems mounted on the virtual drives behave just as they would on a traditional drive. Referring to FIG. 2, an exemplary partitioned disk structure is illustrated. Partition A 200 begins at an offset of one hundred (100) and Partition B 202 begins at offset three hundred forty. On a conventional storage system, the partitions would map to a hard disk, CD-ROM, or perhaps even some removable type of media. In the virtual storage device driver of the present invention, analogous partitions can be implemented within a file used as doc.txt 300 on the disk and ascertains its position in the partition. Next, at step 404, the partition manager driver 304 translates the position of the doc.txt 300 file from a partition relative address to a disk relative address. The I/O requests are then translated to IRP Read Sector commands which are then sent to the disk driver 306. In the present example there would be an IRP Read Sector command for sector one hundred and another for sector three hundred forty, corresponding to the offsets of the partitions 200, 202 in the backing store file 310, here shown to be a file named "image.iso."

Continuing on to step 406, the disk driver 306 translates the I/O requests that it receives to SCSIOP_READ SCSI commands and sends these commands to the underlying hardware. In the present example there would be an SCSIOP_READ Block command for sector one hundred and another for sector three hundred forty, corresponding to the offsets of the partitions 200, 202 in the backing store file 310. Finally, at step 408 the virtual storage device driver 308 handles these SCSI commands just as a "real" hardware device would, calculating and reading the data from the corresponding offset in the backing store, which may be implemented in removable storage 108, or non-removable storage 110. In the present example the virtual storage device driver 308 would read 2048 bytes from an offset computed as one hundred times two thousand forty-eight and 2048 bytes from offset computed as three hundred forty times two thousand forty-eight from the backing store for the requested 4096 bytes from the doc.txt document 300.

In view of the many possible embodiments to which the principles of this invention may be applied, it should be recognized that the embodiments described herein with respect to the drawing figures are meant to be illustrative only and should not be taken as limiting the scope of invention. For example, for performance reasons the method of the present invention may be implemented in hardware, rather than in software. Therefore, the invention as described herein contemplates all such embodiments as may come within the scope of the following claims and equivalents thereof.

What is claimed is:

1. A method for dynamically creating a virtual storage device on a physical computer system, the physical computer system comprising software monitoring created devices, the method comprising:

loading a system bus driver module, wherein the system bus driver module simulates a system bus adapted to interface with a plurality of virtual storage devices;

dynamically creating a virtual storage device on the simulated system bus by creating a physical device object for the created virtual storage device, the created virtual storage device simulating a physical storage device not operatively connected to the physical computer system;

returning a hardware ID to the software monitoring created devices, wherein the hardware ID identifies a type of the physical storage device simulated by the created virtual storage device;

attaching, to the created virtual storage device, a storage class driver corresponding to the type of the physical storage device based on processing done by the software monitoring created devices;

creating at least one partition on a storage medium of the physical computer system, the storage medium being of a first device type;

creating a formatted backing store on the at least one partition, the formatted backing store being formatted like a second device type different from the first device type, the second device type being a type of the simulated physical storage device;

mapping the virtual storage device to the formatted backing store in the storage medium of the physical computer system such that data written to the virtual storage device is written to the at least one partition on the storage medium of the physical computer system;

mounting a file system to each partition on the created virtual storage device; and handling I/O requests to the created virtual storage device by calculating offsets in the formatted backing store; and dynamically creating at least one second virtual storage device of the plurality of virtual storage devices on the simulated system bus by creating a second physical device object for the at least one second virtual storage device wherein the second virtual storage device is of a different type than the first virtual storage device, the at least one virtual storage device simulating a second physical storage device not operatively connected to the computer system different from the first physical storage device; and automatically performing a plurality of testing operations to test functions of the software or hardware components involving interactions with the first and second physical storage devices, the automatically testing comprising simulating the first and second physical storage devices with the first virtual storage device and the second virtual storage device, wherein performing a plurality of testing functions comprises performing at least one testing operation for the first virtual storage device and the second virtual storage device.

2. The method of claim 1 wherein the created virtual storage device is a removable disk drive.

3. The method of claim 1 wherein the created virtual storage device is a fixed disk drive.

4. The method of claim 1 wherein the created virtual storage device is an optical disk drive.

5. The method of claim 1 wherein the formatted backing store is formatted in ISO9660 format.

6. The method of claim 1 wherein the formatted backing store is formatted in UDF format.

7. The method of claim 1 wherein the formatted backing store contains a partition table and at least one partition.

8. A computer storage medium having computer-executable instructions for performing the steps recited in claim 1.

9. A computer storage medium having computer-executable components and software monitoring created devices, the computer-executable components adapted for execution on a physical computer comprising a memory, the computer-executable components comprising a plurality of modules, the modules comprising:

a system bus driver module for simulating a system bus adapted to interface with a plurality of virtual storage devices;

a virtual storage device creation module for creating a virtual storage device on the simulated system bus by creating a physical device object, the created virtual storage device simulating a physical storage device not operatively coupled to the physical computer system, and returning a hardware ID to software monitoring created devices identifying a type of the physical storage device simulated by the created virtual storage device;

a storage class attachment module for attaching, to the created virtual storage device, a storage class driver corresponding to the type of the physical storage device based on processing done by the software monitoring created devices;

a partition manager module for creating a partition on a storage medium of the physical computer system, the storage medium being of a first device type, and mapping the virtual storage device to the partition in the storage medium of the physical computer system such that data written to the virtual storage device is written to the partition on the storage medium of the physical computer system;

a file system mounting module for mounting a file system to each partition on the created virtual storage device;

an I/O request module for handling I/O requests to the created virtual storage device by calculating offsets in the formatted backing store; and dynamically creating at least one second virtual storage device of the plurality of virtual storage devices on the simulated system bus by creating a second physical device object for the at least one second virtual storage device wherein the second virtual storage device is of a different type than the first virtual storage device, the at least one virtual storage device simulating a second physical storage device not operatively connected to the computer system different from the first physical storage device; and automatically performing a plurality of testing operations to test functions of the software or hardware components involving interactions with the first and second physical storage devices, the automatically testing comprising simulating the first and second physical storage devices with the first virtual storage device and the second virtual storage device, wherein performing a plurality of testing functions comprises performing at least one testing operation for the first virtual storage device and the second virtual storage device.

10. The computer storage medium of claim 9 wherein the created virtual storage device is a removable disk drive.

11. The computer storage medium of claim 9 wherein the created virtual storage device is a fixed disk drive.

12. The computer storage medium of claim 9 wherein the created virtual storage device is an optical disk drive.

13. A method for automating testing of software or hardware components by creating a plurality of virtual storage devices on a computer system comprising software monitoring created devices, the method comprising:

loading a system bus driver module, wherein the system bus driver module simulates a system bus adapted to interface with the plurality of virtual storage devices;

dynamically creating a first virtual storage device of the plurality of virtual storage devices on the simulated system bus by creating a physical device object for the first virtual storage device, the first virtual storage device simulating a first physical storage device not operatively connected to the physical computer system;

returning a hardware ID to the software monitoring created devices, wherein the hardware ID identifies a type of the physical storage device simulated by the first virtual storage device;

attaching, to the first virtual storage device, a storage class driver corresponding to the type of the physical storage device based on processing done by the software monitoring created devices;

creating a partition on a storage medium of the physical computer system, the storage medium being of a first device type;

mapping the first virtual storage device to the partition on the storage medium of the computer system such that data written to the first virtual storage device is written to the partition on the storage medium of the computer system;

mounting a file system to the partition on the storage medium;

handling I/O requests to the first virtual storage device by calculating offsets in the formatted backing store; and dynamically creating at least one second virtual storage device of the plurality of virtual storage devices on the simulated system bus by creating a second physical device object for the at least one second virtual storage device wherein the second virtual storage device is of a different type than the first virtual storage device, the at least one virtual storage device simulating a second physical storage device not operatively connected to the computer system different from the first physical storage device; and automatically performing a plurality of testing operations to test functions of the software or hardware components involving interactions with the first and second physical storage devices, the automatically testing comprising simulating the first and second physical storage devices with the first virtual storage device and the second virtual storage device, wherein performing a plurality of testing functions comprises performing at least one testing operation for the first virtual storage device and the second virtual storage device.

14. The method of claim 13 further comprising an act of creating a formatted backing store on the at least one partition, the formatted backing store being formatted like a second device type different from the first device type.

15. The method of claim 13 wherein the plurality of testing operations comprises simulating, using one of the first and second virtual storage devices, insertion of a compact disc into a CD-ROM drive to test at least one of autoplay functionality, CD burning functionality, or audio playback functionality.

16. The method of claim 13 wherein the plurality of testing operations comprises a first subset of testing operations involving interactions with the first physical storage device and a second subset of testing operations involving interactions with the second physical storage device.

17. The method of claim 13 wherein the partition manager module is further adapted to create a formatted backing store on the partition, the formatted backing store being formatted like a second device type, different from the first device type.

* * * * *